United States Patent [19]

Katz et al.

[11] 4,396,750

[45] Aug. 2, 1983

[54] PROCESS FOR SYNTHESIZING SILYLATED POLYALKENAMERS

[75] Inventors: Thomas J. Katz, New York, N.Y.; Michael A. Shippey, San Rafael, Calif.

[73] Assignee: The United States of America as represented by the Secretary of the Navy, Washington, D.C.

[21] Appl. No.: 266,878

[22] Filed: May 26, 1981

[51] Int. Cl.³ .............................................. C08F 4/78
[52] U.S. Cl. .................................. 526/279; 526/166; 526/172; 525/326.5; 525/343
[58] Field of Search ....................................... 526/279

[56] References Cited

U.S. PATENT DOCUMENTS

| | | | |
|---|---|---|---|
| 3,480,584 | 11/1969 | Archer | 526/279 |
| 3,781,251 | 12/1973 | Hermes | 526/279 |
| 3,857,825 | 12/1974 | Streck | 526/279 |
| 3,920,714 | 11/1975 | Streck | 526/279 |
| 3,920,715 | 11/1975 | Streck | 526/279 |
| 3,929,850 | 12/1975 | Streck | 526/279 |
| 4,105,648 | 8/1978 | Gruber | 526/204 |
| 4,230,815 | 10/1980 | Itoh | 526/335 |

FOREIGN PATENT DOCUMENTS

| | | | |
|---|---|---|---|
| 285237 | 1/1971 | U.S.S.R. | 526/279 |
| 285238 | 1/1971 | U.S.S.R. | 526/279 |

OTHER PUBLICATIONS

Katz, T. J., Lee, S. J., Shippey, M. A., Preparation of Polym. Using Metal-Carbenes, J. of Molecular Catalysis, vol. 8, 219-226, (May 27, 1980).

*Primary Examiner*—C. A. Henderson
*Attorney, Agent, or Firm*—Robert F. Beers; Arthur A. McGill; Prithvi C. Lall

[57] ABSTRACT

A process for polymerizing cycloalkenes into polyalkenamers is described wherein trisubstituted silyl groups are attached to the cycloalkenes. The silyl groups thus attached do not act as a poison to the polymerization process. Trimethylsilyl group can be substituted by other desired functional groups after the polymerization.

4 Claims, 5 Drawing Figures

PROCESS FOR SYNTHESIZING SILYLATED POLYALKENAMERS

BACKGROUND OF THE INVENTION

This invention is related to cycloolefin metathesis and, more particularly, to a process for making functionalized polyalkenamers.

As pointed out by Ofstead in U.S. Pat. No. 4,172,932, the olefin metathesis reaction is a unique bond reorganization process wherein materials possessing carbon-to-carbon double bonds undergo a redistribution of constituents as depicted by the example in equations (1) and (2) on the following page:

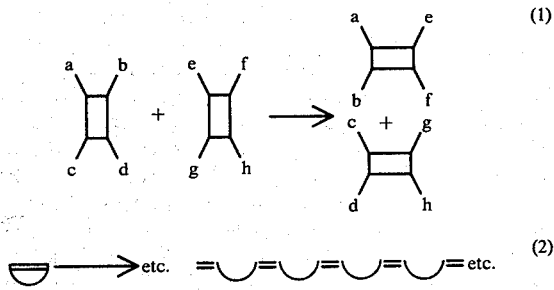

This reaction is considered to proceed by the cleavage of the carbon-to-carbon double bond in the reacting olefin.

Similarly, the ring-opening polymerization reaction of cycloolefins also involves the scission of the carbon-to-carbon double bonds in the cycloolefin ring. The alkylidene carbons are rejoined to other such carbons derived from other monomer units to form the linear unsaturated polymer chain.

Processes for the metathesis polymerization of cycloolefins are known in the prior art. They teach the use of a variety of transition metal compounds in combinations with various cocatalysts and catalysts modifiers for the ring-opening polymerization or copolymerization of cycloolefins. Some examples of such efforts are U.S. Pat. Nos. 3,920,714; 3,920,715 and 3,929,850 to Streck. However, these examples teach the use of molecules containing C-Si-X where X is halogen or oxygen, and in which the C-Si bond stays attached. It is thus desirable to have a procedure in which cycloalkenes are substituted by functional groups that do not act as poisons to the metathesis polymerization reaction and yet can be substituted by some other desired functional groups.

SUMMARY OF THE INVENTION

The objects and advantages of the present invention are accomplished by utilizing trisubstituted silyl groups which are attached to a cycloalkene. The polymerization of the cycloalkene to which silyl groups have been attached is not affected by the attached silyl groups. The silyl groups can then be replaced by some other desired functional groups.

It is an object of the subject invention to have a procedure in which incorporation of some functional groups in a cycloalkene does not act as a poison to the cycloalkene metathesis reaction for its polymerization.

Another object of the subject invention is to attach silyl groups to the cycloalkene used for polymerization wherein the silyl groups can be later replaced by some other desired functional groups.

Other objects, advantages and novel features of the invention will become apparent from the following detailed description of the invention when considered in conjunction with the accompanying drawings wherein:

The novel features of the subject invention are accomplished by illustrating the following examples of the best mode of carrying out the invention. However, it should be clearly understood that these examples should not be construed as being limited on the scope or spirit of the invention.

According to the subject invention, cycloalkenes, to which trisubstituted silyl groups are attached polymerize without any adverse effect on olefin metathesis reaction. For example, 1-trimethyl-silylcyclobutene gives poly(1-trimethylsilyl-but-1-ene-1,4-diyl) as shown in equation (3) below:

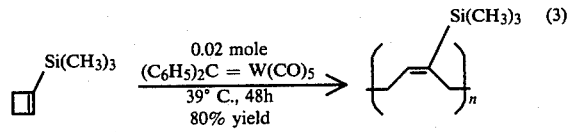

Moreover, the trimethylsilyl group can be substituted after the polymerization by other functional groups. For example, as shown in equation (4) below, polymer obtained in equation (3) with phenylsulfenyl chloride and then tetra-n-butylammonium fluoride gives poly(1-phenylthio-but-1-ene-1,4-diyl), which is very difficult if not impossible to make directly by metathesis.

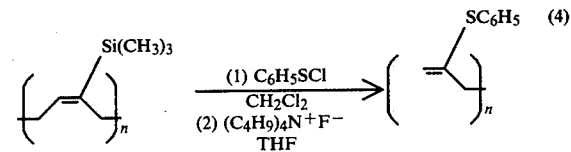

EXAMPLES

1. Polymerization of 1-trimethylsilylcyclobutene
   (a) Using $(C_6H_5)_2C=W(CO)_5$ as the initiator
   (i) Preparation of 1-trimethylsilylcyclobutene To an ice-cooled suspension of 3.5 grams (0.5 mol) of lithium (containing 2% sodium, dispersed in oil) in 50 mL (milliliters) dry diethyl ether under an argon atmosphere in a 250 mL round bottomed flask, a solution of 10.6 gm (0.082 mol) 1-bromocyclobutene in 50 mL ether was added in drops. After stirring for two hours at 0° C., a solution of 10 mL (0.079 mol) of chlorotrimethylsilane (distilled from CaH$_2$) in 50 mL of ether was added in drops. The mixture was stirred overnight and gradually warmed to room temperature. Solids were filtered, washed with ether, and the filtrate and washings distilled (bp 104°–105° C.) to give 1-trimethylsilylcyclobutene. Its $^1$H NMR spectrum consisted of three groups of peaks: at $\delta 0.05$ (s, 8.90 H, SiCH$_3$); ca. about 2.5 (m, 4.10 H, CH$_2$); 6.47 (s, 1.00 H, CH). Before polymerization, this material was redistilled, stirred for 24 h with 0.3 equiv. of N-phenyl-triazoline-dione, and redistilled again.

(ii) Polymerization

A solution of 1 gram (7.5 mmol) of the silane in an equal amount of pure n-nonane was filtered through ca. 1 gram basic alumina, degassed at high vacuum (ca. $10^{-6}$ torr; 1 torr = 1 mm of Hg) transferred to a tube containing 0.15 mmol (millimole) of the initiator. The tube was sealed, heated at 39° C. for 48 hours, and the contents were then dissolved in CH$_2$Cl$_2$ and precipitated by CH$_3$OH. The dissolution and precipitation were repeated twice more, and the precipitate was then dried in a vacuum, giving an 80% yield of the polymer.

Figure 1:
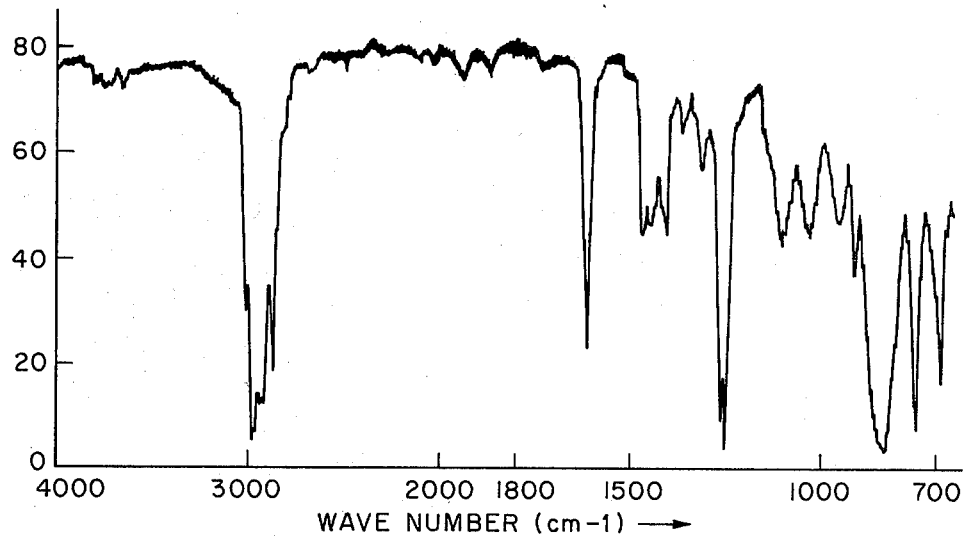
FIG. 1 represents infrared spectrum of poly(1-trimethylsilylbut-1-ene-1,4-diyl)
Figure 2:
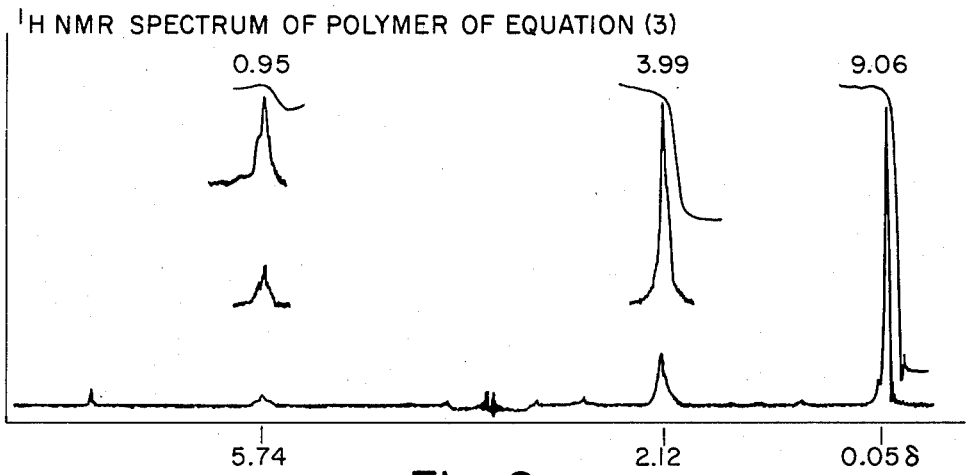
FIG. 2 represents $^1$H NMR spectrum of the polymer of FIG. 1.
Figure 3:
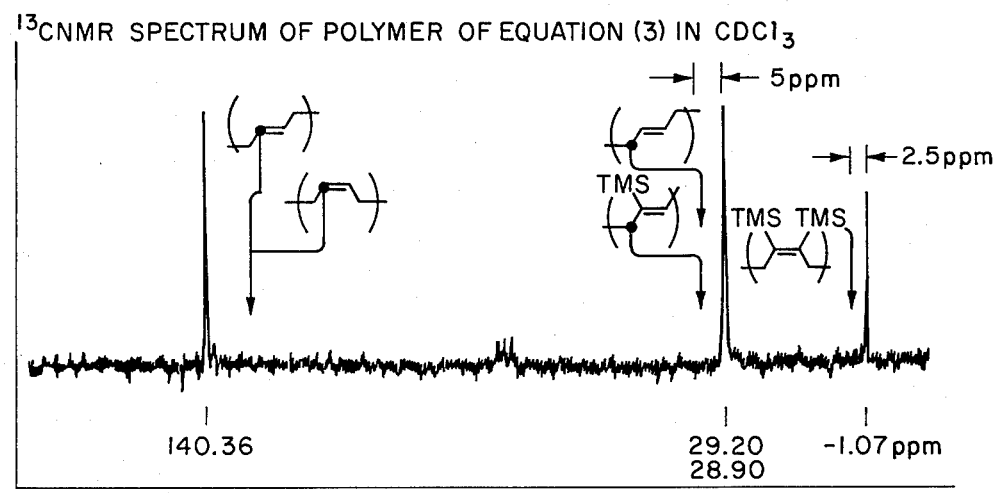
FIG. 3 represents $^{13}$C NMR spectrum of the polymer of FIG. 1.

Its infrared, $^1$H NMR, and $^{13}$C NMR spectra are displayed in FIGS. 1, 2 and 3, respectively. FIG. 1 is a plot of infrared absorption curve as plotted against wave number (cm$^{-1}$) along X-axis and indicates various absorption peaks for the polymer obtained in example 1. FIG. 2 is a representative $^1$H NMR (Nuclear Magnetic Resonance) spectrum for the polymer of example 1. As shown therein chemical shifts are below and intensities are above the curve. The lock signal is that of dioxane, and it is used as the internal standard ($\delta = 3.7$). FIG. 3 represents the $^{13}$C NMR spectrum of the same compound in CDCl$_3$. The spectrometer frequency was 2.0 megahertz (MHz) and 2600 spectra were accumulated using ca (about) 45° pulses repeated at 0.82 sec. intervals (no relaxation delay). Arrows in the figure point to where significant resonances might have appeared had there been appreciable numbers of units present with alternative stereochemistries.

Its viscosity in toluene at 29.5° C. is $[\eta] = 2.14$ dL/gm (deciliter/gram) and its molecular weights according to gel permeation chromatography (GPC) in tetrahydrofuran (recorded as the weights of polystyrenes that would display chromatograms like those observed) are $\overline{M}_n = 78,000$, $\overline{M}_w = 135,000$ where $\overline{M}_w$ (weight average molecular weight) and $\overline{M}_n$ (number average molecular weight) are defined as: $\Sigma N_i M_i^2 / \Sigma N_i M_i$ and $\Sigma N_i M_i / \Sigma N_i$, respectively, Ni being the number of polymer chains having mass $M_i$. The polymer is white in color and dissolves in benzene, toluene, tetrahydrofuran, methylene chloride, and chloroform. It is insoluble in methanol.

(b) Using (C$_6$H$_5$)(CH$_3$O)C=W(CO)$_5$ as the initiator

The procedure was the same as in 1.a except that the amount of the initiator was 0.070 mmol, the reaction temperature was 80° C., and the yield was 50%. The $^1$H NMR and $^{13}$C NMR spectra of the polymer are the same as before, $[\eta]=$(toluene, 29.5° C.)=0.75 dL/g,(deciliter per gram) $M_w = 28,000$, $M_n = 17,000$.

(c) Using WCl$_6$ plus (n-C$_4$H$_9$)$_4$Sn as the initiator

To a suspension of 22 mg (55 $\mu$mol) WCl$_6$ in 1.8 mL chlorobenzene stirred at room temperature under nitrogen was added by syringe a solution of 343 mg (2.7 mmol) of the silane plus 230 mg (0.66 mmol) tetra-n-butyltin in 252 mg n-nonane. (The liquids had been passed over basic alumina.) After standing overnight, methanol was added to precipitate the polymer. Dissolving in chloroform and precipitating with methanol (two times) and drying in a vacuum gave 82 mg (a 24% yield) of a white polymer whose infrared and $^{13}$C NMR spectra are like those of the samples made above.

2. Poly(1-phenylthio-but-1-ene-1,4-diyl)

Figure 4:
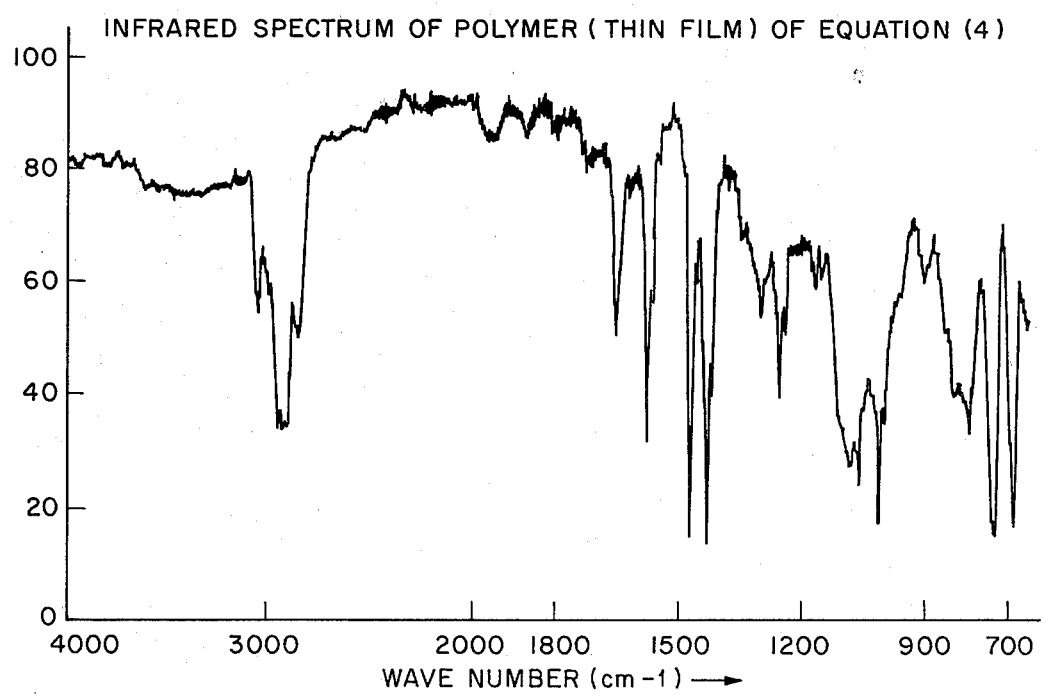
FIG. 4 shows infrared spectrum of the polymers of FIG. 1 wherein trimethylsilyl group has been substituted by a function group.
Figure 5:
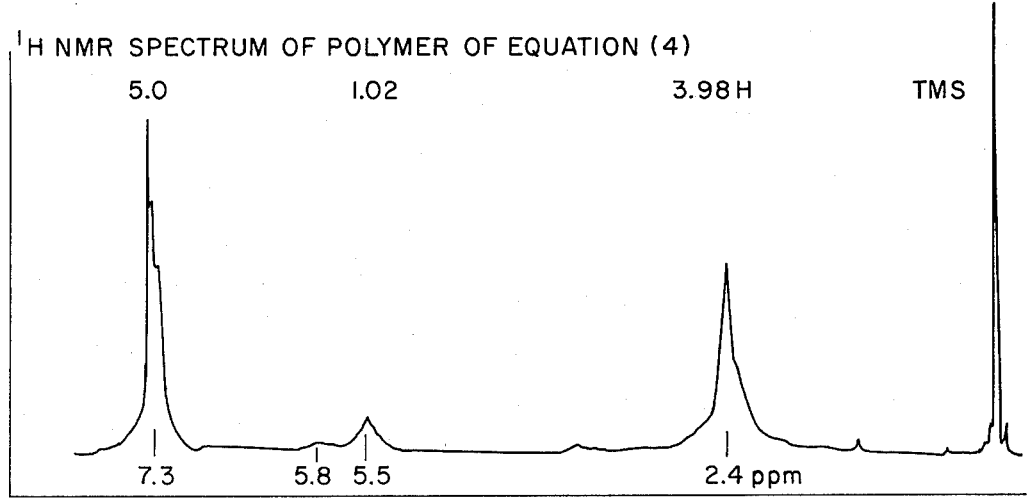
FIG. 5 indicates $^1$H NMR spectrum of the polymer of FIG. 4.

To a solution cooled to 0° C. of 111 mg (0.88 mequiv) of polymer of 1-trimethylsilylcyclobutene as obtained in 1.a and given by equation (3) dissolved in 50 mL dichloromethane was added 0.09 mL (0.88 mequiv) of phenylsulfenyl chloride. After 30 minutes stirring at 0° C. and 1 hour at room temperature, the solvent was removed at reduced pressure and replaced by 50 Ml tetrahydrofuran. To the stirred solution at 0° C. was added in drops 0.95 mL 1 M. anhydrous tetra-n-butylammonium fluoride in tetrahydrofuran, whereupon the color of the reaction mixture turned black. After 1 hr at 0° C. the mixture was poured into 100 ml cold methanol, which precipated a polymer that was collected and dried in a vacuum (110 mg, 70% yield) to obtain the polymer given by equation (2). The infrared and $^1$H NMR spectra of this material (which is orange in color) are displayed in FIGS. 4 and 5, respectively. The molecular weights, recorded as previously, are $\overline{M}_w = 68,000$, $\overline{M}_n = 40,000$. FIG. 5 shows $^1$H NMR spectrum of poly(1-phenylthio-but-1-ene-1,4,diyl) as given by equation (2), where the spectrum frequency was 80 MHz and 220 spectra were accumulated using ca (about) 28° pulses. Chemical shifts are below and intensities are above the spectrum. The internal standard was tetramethylsilane (TMS). The spectrum was also measured before the internal standard was added, and the intensity of any peaks in the vicinity of $\delta°$ was less than 0.0404 H.

The preceeding examples can be reached with similar success by substituting the generically or specifically described reactants under/or operating conditions of the invention for those used in the preceeding examples.

From the foregoing description, one skilled in the art can easily ascertain the essential characteristics of this invention and without departing from the spirit and scope thereof, can make various changes and modifications of the invention to adapt it to various useages and conditions. It is therefore understood that within the scope of the appended claims the invention may be practiced otherwise than as specifically described.

What is claimed is:

1. A polymer, poly(1-trimethylsilyl-but-1-ene-1,4 diyl) belonging to the group given by the formula

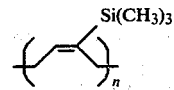

where n is the number of 1-trimethylsilylcyclobutene molecules used in the polymerization process for the number molecular weight of said polymer to be between 17,000 to 78,000.

2. The polymer of claim 1 which has a viscosity in toluene at 29.5° C. to be at least 2.14 dL/gm.

3. The polymer of claim 1 which is soluble in benzene, toluene, tetrahydrofuran, methylene chloride and chloroform.

4. The polymer of claim 1 which is insoluble in methanol.